United States Patent

[11] 3,530,763

[72] Inventors Gayle E. Grim
 La Crosse;
 Abe G. Whitehead, Onalaska, Wisconsin
[21] Appl. No. 807,373
[22] Filed March 14, 1969
[45] Patented Sept. 29, 1970
[73] Assignee The Trane Company
 La Crosse, Wisconsin
 a corporation of Wisconsin

[54] MACHINE TOOL
 2 Claims, 4 Drawing Figs.
[52] U.S. Cl. .................................................. 90/24,
 90/43, 83/581
[51] Int. Cl. ..................................................... B23d 9/00

[50] Field of Search............................................ 90/24, 43,
 44, 45, 46, 47; 144/75, 76; 83/581, 916; 145/24,
 25, 5, 6

[56] References Cited
 UNITED STATES PATENTS
 3,192,835 7/1965 Leibinger ..................... 90/24

Primary Examiner—Gil Weidenfeld
Attorneys—Arthur O. Andersen, Carl M. Lewis and Lee E. Johnson ABSTRACT: A novel beveling tool having a double cutting edge which is adaptable for reciprocating motion is disclosed along with a reciprocating means, a workpiece holder, and the method for using the tool.

Patented Sept. 29, 1970
3,530,763
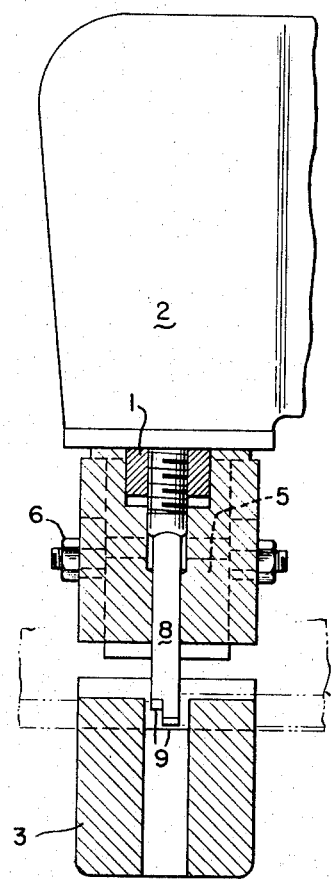
FIG. 1
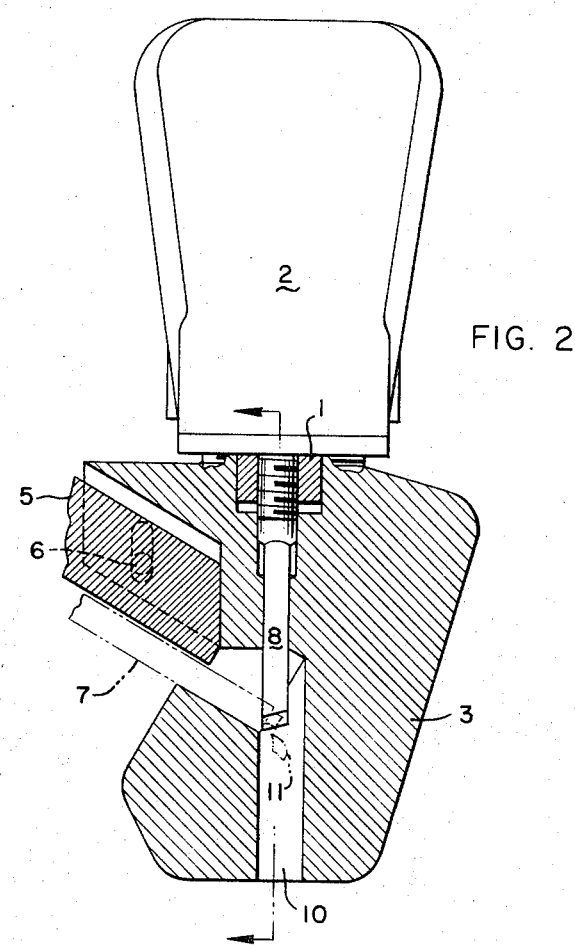
FIG. 2
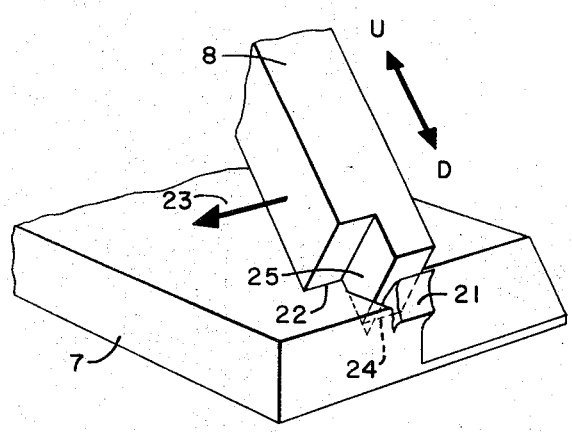
FIG. 4
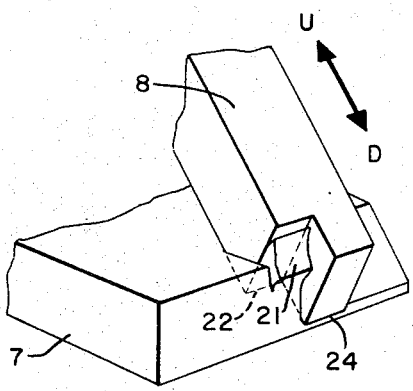
FIG. 3
INVENTORS.
GAYLE E. GRIM
ABE G. WHITEHEAD
BY
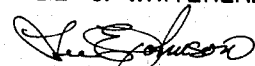
ATTORNEY

MACHINE TOOL

BACKGROUND OF THE INVENTION

1. Field of the Invention

This invention relates to forming tools and particularly to an apparatus and method for beveling a workpiece.

2. Description of the Prior Art

Reciprocating cutting tools are known to the art. A particular hand-held apparatus for beveling a workpiece is shown in U.S. Pat. No. 3,192,835, the disclosure of which is incorporated herein by reference. An average machine as disclosed in that patent weighs approximately 30 pounds, has a maximum length of bevel of 0.4 inches and a feed rate of around 8 feet per minute. In industrial applications it is highly desirable and sometimes necessary to make a bevel which has a face wider than 0.4 inches. The only way to increase the width of a bevel using machine tool technology was to increase the length of the stroke of the beveling machine. Lengthening the stroke so that a maximum bevel width of 0.6 inches results in a beveling tool weighing approximately 50 pounds and having a maximum feed rate of about 4 feet per minute.

It is to be noted that a desirable beveling tool is hand held, thus facilitating working on surfaces to be beveled which are other than straight line. It is also to be noted that workpieces to be beveled are not of the type which can be hand held and run through a beveling tool. It is of great importance therefore that the beveling tool be hand manipulatable. When producing beveled workpieces, a single man will usually operate a beveling tool of the type described for an entire day. A 30 pound machine is within the realm of a single person's capabilities; however, when a 50 pound machine must be used more than one man working in shifts are necessary to prevent fatigue. Furthermore, the feed rate of the larger machine is about half that of the machine having the smaller bevel width capability.

It is, therefore, desirable to possess a beveling tool which can produce a bevel of up to 0.8 inches, weighs approximately 30 pounds and has a feed rate of approximately 8 feet per minute on a given workpiece. The invention disclosed hereafter has these capabilities.

SUMMARY OF THE INVENTION

The disclosed invention therefore provides a cutting tool adapted for reciprocating motion comprising a first cutting edge having a component transverse to the line of reciprocation, and a second cutting edge coplanar with the first cutting edge which lies in a longitudinal plane and is spaced longitudinally from the first cutting edge. Preferably the cutting edges form a discontinuous straight line with the discontinuity lying on a longitudinal line, i.e. the line of reciprocation. The cutting edges are also preferably substantially parallel.

The invention also provides a method for beveling a workpiece which comprises chipping a remaining portion of material from a workpiece along a bevel plane and simultaneously chipping a first portion of adjacent material from a workpiece along an adjacent bevel plane.

BRIEF DESCRIPTION OF THE DRAWINGS

FIG. 1 is a partially cross-sectional, elevation view of the tool of the present invention.

FIG. 2 is a partially cross-sectional, side elevation view of the beveling tool of the present invention.

FIGS. 3 and 4 are views illustrating the action of the beveling tool of the present invention on the workpiece.

DESCRIPTION OF THE PREFERRED EMBODIMENTS

Referring to FIG. 1 and FIG. 2 a reciprocable plunger 1 is mounted for sliding reciprocating motion in head 2. A driving means (not shown) is contained within the head portion 2. A stirrup or workpiece holder 3 is also attached to head 2. Stirrup 3 is fixedly attached to head 2 to allow reciprocating motion of plunger 1 relative to the stirrup. An opening 4 is provided in stirrup 3 for insertion of a workpiece 7 to be beveled therein. Adjustable means 5 is included to allow compensation for various workpiece thicknesses. Adjustable bracket 5 is held securely in place by bolt arrangement 6. Because stirrup 3 is not a major portion of my invention it has been simply shown and described herein. For a stirrup arrangement which provides for more complex adjustment of workpiece relative to the beveling tool, refer to the patent referenced above.

Removably inserted in plunger 1 is beveling tool 8, shown to be screwably fastened. Beveling tool 8 has two substantially parallel cutting edges 9. The operation of these cutting edges when beveling a workpiece 7 will be described below in conjunction with FIGS. 3 and 4. A second opening 10 communicating with the first opening 4 is provided to allow reciprocating motion of the tool 8 and to allow for disposal of chips or particles 11, which are removed from the workpiece 7 during the beveling process.

Referring now to FIGS. 3 and 4, the end portion of beveling tool 8 (FIG. 2) is shown operating on a workpiece 7. The beveling tool is shown in FIG. 3 chipping a first portion of material 21 along a bevel plane formed by the downstroke of cutting edge 22. Beveling tool 8 is shown in FIG. 3 at the end of its downstroke, designated D, immediately prior to reversal of motion for the upstroke, designated U. As the beveling tool reaches the end of its upstroke, shown in FIG. 4, a lateral force is applied to the tool in the direction of arrow 23 through pressure applied to head 2 by the operator. This causes the tool to move laterally so that cutting edge 23 is operating on the bevel, formed by edge 22. As the tool begins its downstroke, cutting edge 23 will chip the remaining portion of material 21 from the workpiece 7. Simultaneously cutting edge 22 will repeat the operation shown in FIG. 3 on a next adjacent bevel plane.

The invention disclosed herein has several distinct advantages over beveling tools of the prior art. First, because of the design of the tool 8, an index stop is not needed to prevent the cutting edges from going beyond the next adjacent bevel plane. Face 25 provides inherent stop action. Secondly, the beveling tool 8 of my invention can be inserted in prior reciprocating machine tools with no further alteration. This beveling tool can double the effective bevel width attainable with a given device. For example, if the beveling tool 8 is inserted in a prior art device of the type described above, the effective bevel width can be increased from 0.4 inches to 0.8 inches without adversely affecting the feed rate and without alterating the weight of the beveling apparatus. In fact, the beveling tool of this invention is capable of achieving feed rates slightly higher than that obtainable with prior art devices.

We claim:

1. A method for machining a workpiece comprising:
   a. positioning a reciprocable tool having at least two substantially coplanar, longitudinally spaced cutting edges relative to a workpiece so that said cutting edges are capable of shearing contact with said workpiece;
   b. longitudinally driving said tool in a first direction to shear a first portion of material from said workpiece along a first cutting plane with a first portion of a cutting edge;
   c. reversing the longitudinal motion of said tool and indexing said tool to position a second cutting edge along said first portion of said cutting plane while positioning said first cutting edge along an adjacent portion of said cutting plane;
   d. reversing the longitudinal motion of said tool and driving said tool in said first direction to shear a first portion of material along said adjacent portion of said cutting plane and to simultaneously shear the remaining portion of material from said workpiece along said first portion of said cutting plane; and
   e. repeating steps (c) and (d) to shear additional portions of material along said cutting plane.

2. In a machine tool comprising:
   a. a head;

b. a reciprocable plunger mounted in said head and adapted to hold a cutting tool;
c. means for driving said reciprocable plunger;
d. a stirrup attached to said head for holding a workpiece and said tool in operable relationship, the improvement comprising; and
e. a cutting tool adapted for longitudinally reciprocating motion mounted in said reciprocable plunger including a first cutting edge having a transverse component, a second cutting edge having a transverse component spaced longitudinally from said first cutting edge, said cutting edges being substantially coplanar in a longitudinal plane.

UNITED STATES PATENT OFFICE
CERTIFICATE OF CORRECTION

Patent No. 3,530,763                        September 29, 1970

Gayle E. Grim et al.

It is certified that error appears in the above identified patent and that said Letters Patent are hereby corrected as shown below:

Column 2, line 58, "first cu-ting plane with a first portion of a cutting edge;" should read -- first portion of a cutting plane with a first cutting edge; --.

Signed and sealed this 30th day of March 1971.

(SEAL)
Attest:

EDWARD M. FLETCHER, JR.                  WILLIAM E. SCHUYLER, JR.
Attesting Officer                          Commissioner of Patents